(12) United States Patent
Burckart et al.

(10) Patent No.: US 8,892,053 B2
(45) Date of Patent: *Nov. 18, 2014

(54) CACHE HITS VIA A USERS SPEED, DIRECTION OF MOVEMENT, LOCATION, AND BAND WITHIN A CELLULAR NETWORK

(75) Inventors: Erik J. Burckart, Raleigh, NC (US); Duke Chang, Hillsborough, NC (US); Victor Moore, Lake City, FL (US); Robert B. Nicholson, Southsea (GB)

(73) Assignee: International Business Machines Corporation, Armonk, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 13/420,571

(22) Filed: Mar. 14, 2012

(65) Prior Publication Data

US 2013/0244711 A1    Sep. 19, 2013

(51) Int. Cl.
*H04B 17/00* (2006.01)

(52) U.S. Cl.
USPC ......... 455/67.16; 455/418; 455/502; 455/514

(58) Field of Classification Search
USPC .......... 455/502, 507, 514, 67.11, 422.1, 446, 455/418, 419, 420, 423, 424, 67.16; 709/203, 224, 225, 223
See application file for complete search history.

(56) References Cited

U.S. PATENT DOCUMENTS

| 7,085,576 | B2 | 8/2006 | Ranganathan |
| 7,222,169 | B2 | 5/2007 | Koshimizu et al. |
| 7,397,779 | B2 | 7/2008 | Chandra et al. |
| 7,562,393 | B2 | 7/2009 | Buddhikot et al. |
| 7,657,268 | B2 | 2/2010 | Oswal et al. |
| 2007/0094461 | A1 | 4/2007 | Nguyen et al. |
| 2009/0073946 | A1 | 3/2009 | Morita |
| 2010/0131584 | A1* | 5/2010 | Johnson ......................... 709/203 |
| 2011/0172018 | A1* | 7/2011 | Premutico ......................... 463/42 |
| 2012/0179801 | A1* | 7/2012 | Luna et al. ..................... 709/223 |

OTHER PUBLICATIONS

Jing, "Client Server Computing in Mobile Environments," ACM Computing Surveys, vol. 31, No. 2, Jun. 1999, p. 121-123.
Chelliah, "A Novel Distance Based Relocation Mechanism to Enhance the Performance of Proxy Cache in a Cellular Network," Inter. Arab Journal of IT, vol. 6, No. 3, Jul. 2009.
Lee, "Advanced Semisoft Handoff Method of Cellular IP Access Networks," IEEE, 18th Inter. Conf. AINA, 2004, vol. 2, pp. 407-412.
Curran, K., "Minimizing the Handoff Latency in Ad Hoc Networks When Streaming Media to Mobile Devices," Inter. Journal of Wireless Info Networks, Jul. 2001.

* cited by examiner

*Primary Examiner* — John J Lee
(74) *Attorney, Agent, or Firm* — Steven M. Greenberg, Esq.; CRGO Law

(57) ABSTRACT

A method, system, and computer program product for caching data in a cellular network is provided. Information from a cellular network regarding location, speed, direction of travel, and bandwidth for a user can be used to determine how much data should be cached for the user. More specifically, the time period for how long a user will be in a cell of a cellular network can be calculated using information received from the cellular network. The calculated time period can be used to calculate how much data will be used by a user for the calculated time period with only the amount of data needed for the time period being cached.

10 Claims, 3 Drawing Sheets

CACHE HITS VIA A USERS SPEED, DIRECTION OF MOVEMENT, LOCATION, AND BAND WITHIN A CELLULAR NETWORK

BACKGROUND OF THE INVENTION

1. Field of the Invention

The present invention relates to caching and more particularly to caching data in a cellular network.

2. Description of the Related Art

A cellular network is a radio network distributed over land areas called cells. Each cell is served by at least one fixed location transceiver known as a cell site or base station. When joined together, these cells provide radio coverage over a wide geographic area, which allows a large number of portable transceivers, including mobile phones and pagers, to communicate with each other and with fixed transceivers and telephones anywhere in the network via base stations, even if some of the transceivers are moving through more than one cell during transmission. Of note, cellular networks no longer merely provide voice services through mobile phones, but cellular networks also provide data services through mobile devices including mobile phones by providing connectivity between the cell sites of a cellular network and a main carrier network and ultimately, the global Internet.

As a mobile client traverses wireless cell sites in a cellular network, the complexity of the distribution of content to the mobile client despite the movement of the mobile device across the cell sites must remain transparent to the end user. In this regard, when a mobile client moves from one cell site to another while consuming data, for instance while playing a video, no interruption is to occur in the playing of the video on the mobile client notwithstanding the location of the mobile device.

To provide such transparency, different edge devices are deployed in a content distribution network to serve content over a backhaul connection to different cell sites geographically proximate to the edge devices. Ideally, content to be consumed by a mobile device traversing one or more cell sites should be placed at one or more edge devices geographically closest to the cell sites. Thus, the problem remains of determining across which cell sites a mobile device will travel in the future and in which edge device to co-locate content that may be consumed by the mobile device in order to expedite delivery of the content to the mobile device as the mobile device traverses the different cell sites in a cellular network.

BRIEF SUMMARY OF THE INVENTION

Embodiments of the present invention address deficiencies of the art in respect to data caching in a cellular network and provide a novel and non-obvious method, system, and computer program product for caching data in a cellular network. In an embodiment of the invention, a method for caching data in a cellular network is provided and can include calculating a time period for how long a mobile device will be service by a cell site of the cellular network upon receiving travel information for the mobile device from the cellular network. The method can further include calculating how much data will be used by the mobile device for the calculated time period and caching the data to be used by the mobile device for the time period in the cell site.

Another embodiment of the invention provides for a data caching system. The system can include an edge server coupled to a DNS and disposed within a cell site of a cellular network. The edge server can further be configured to support a cache and a data caching module coupled to the cache. The data caching module can include program code for calculating a time period for how long a mobile device will be serviced by a cell site of the cellular network upon receiving travel information for the mobile device from the cellular network, calculating how much data will be used by the mobile device for the calculated time period, and caching the data to be used by the mobile device for the time period during which the mobile device remains serviced by the cell site.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for caching data at the edges of a cellular network. Information about a mobile device, such as the location of a mobile device, field strength of each mobile device in a cell of a cellular network, the speed a mobile device is traveling, the direction a mobile device is going, and bandwidth, can be used to determine how much data should be cached for a mobile device in a cell of a cellular network. In this way, by using information already determined by a cellular network, how much data is cached can be optimized by caching only data that a mobile device in a cell will use for the time period the mobile device is in the cell. Therefore, there is additional room for other cached data as well as increasing the likelihood of a cache hit. In addition, "traffic shaping" can be tailored to the speed at which a mobile device is traveling by allocating more bandwidth to fast moving mobile devices compared to slower moving mobile devices so that the quality of experience can be leveled for all users.

Figure 1:
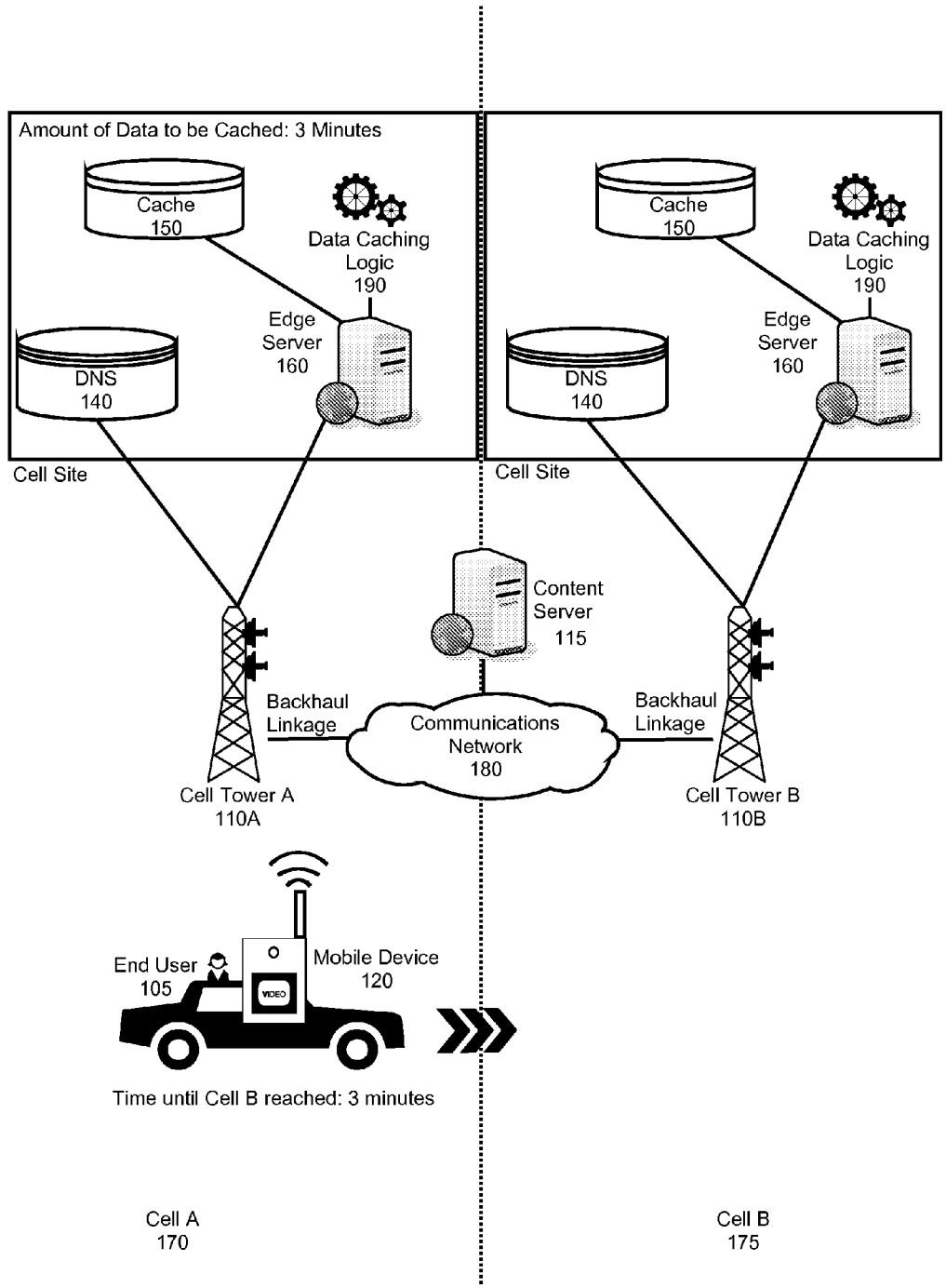
FIG. 1 is a pictorial illustration of a process for caching data in a cellular network.

In further illustration, FIG. 1 pictorially shows a process for caching data in a cellular network. As shown in FIG. 1, an end user 105 can receive data services in a mobile device 120 from a cell site while traversing a cellular network serviced by different cell sites corresponding to different cell towers 110A, 110B in a geographic area. In order to provide the data services in a given cell site, a domain name server (DNS) 140 can be provided in the cell site along with an edge server 160 serving content provided by a content server 115 communicatively coupled to the edge server 160 over communications network 180 linked to the cell site via a backhaul language. Of note, a cache 150 can be provided in association with the edge server 160 in order to cache content provided by the edge server 160 to the mobile device 120.

Notably, data caching logic 190 can be coupled to the edge server 160. The data caching logic 190 can receive from the cellular network data in respect to a speed and direction of travel of the mobile device 120. In this regard, the data can be measured according to the field strength of each mobile device 120 that is in use within each cell of the cellular network. The field strength subsequently can be used to calculate the location, among other information, of each mobile device 120 serviced by a corresponding cell site. Upon receiving the data from the cellular network, the data caching logic 190 can calculate that at seventy miles per hour, by way of example, and by moving in a northward direction from a current position, the end user 105 will cross the average transition boundary between one cell, for instance cell A 170, and an adjacent cell, such as cell B 175, in three minutes.

Thus, in the event that the content provided by the edge server 160 to the mobile device 120 is streaming video, the data caching logic 190 in cell A 170 will then know not to cache within cache 150 more than three additional minutes of the streaming video. In addition, data caching logic 190 will know into which cell the end user 105 will transition. Therefore data caching logic 190 can signal the edge server 160 in the adjacent cell, for instance cell B 175, to begin caching the streaming video so that the remainder of the streaming video will be ready for delivery to the mobile device 120 when the end user 105 enters cell B 175. In this way, each of the edge servers 160 in each cache 150 of each cell site cache the optimal amount of data delivery to the mobile device 120. Additionally, a cell, such as cell A 170, will know from signals provided by adjacent cells, for example cell B 175, if another end user is approaching who receives the same streaming video content. Upon determining another end user is approaching, the cached video can be preserved until needed by the other end user or until it is determined that the video is no longer needed.

Figure 2:
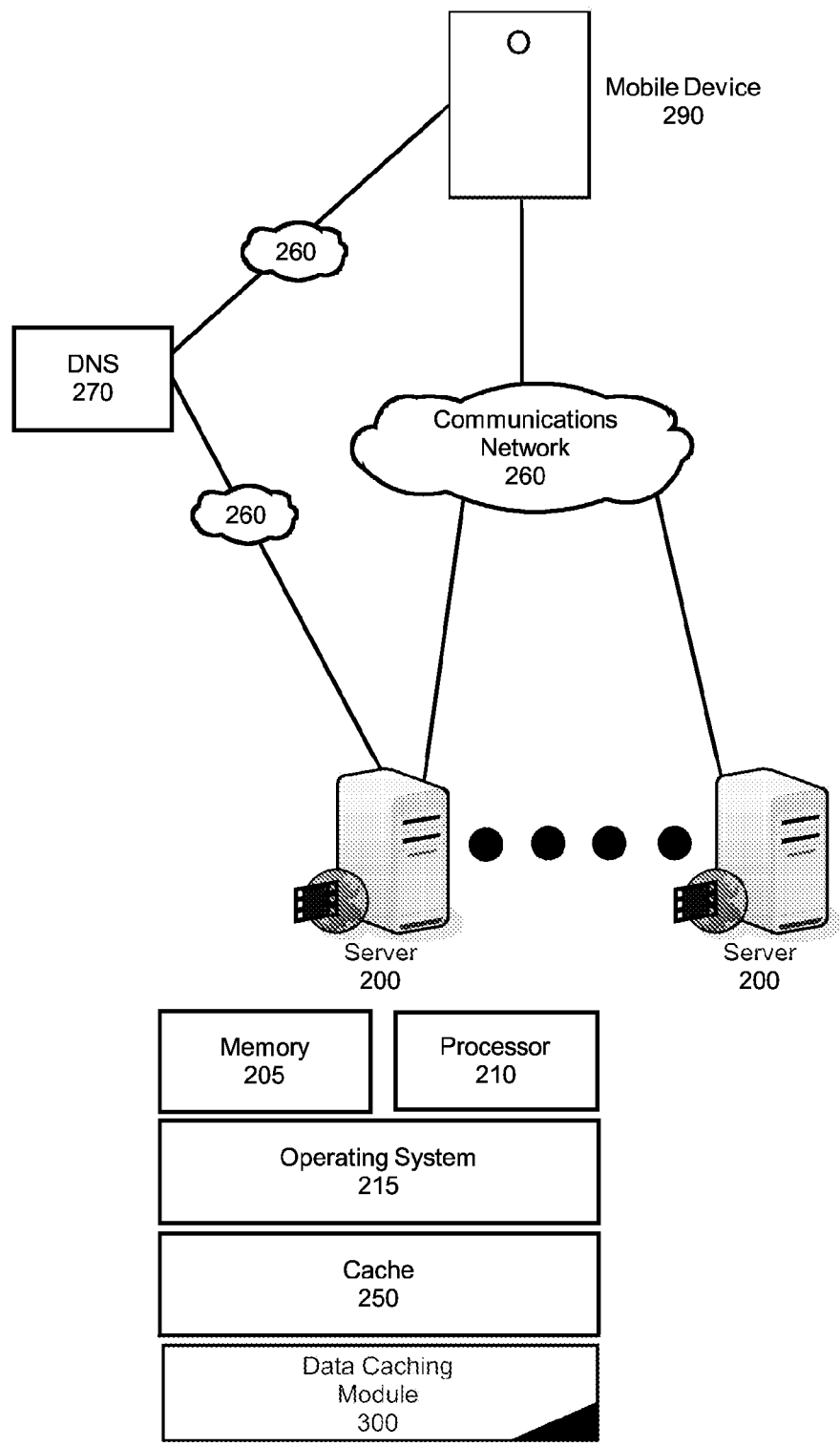
FIG. 2 is a schematic illustration of a data processing system configured for caching data in a cellular network; and, FIG. 3 is a flow chart illustrating a process for caching data in a cellular network.

The process described in connection with FIG. 1 can be implemented in a system as shown in FIG. 2. In further illustration, FIG. 2 schematically shows a data processing system configured for caching data in a cellular network. The data caching system can include at least one server 200. Each server 200 can be coupled to a DNS 270 and a mobile device 290. Optionally, a database (not shown) can be coupled to the server 200; the database can support content storage. The server 200 can communicate with the DNS 270 and mobile device 290 via a communications network 260. The communications network 260 is not limited to a specific communications technique and can include Internet, wireless communications, Ethernet, 3G, and 4G. Each server 200 can include at least one processor 210 and memory 205 supporting the execution of an operating system (O/S) 215. The O/S 215 in turn can support a cache 250 and a data caching module 300A. Note, for simplicity, only one DNS 270 and mobile device 290 is shown, but multiple of these components can be present in the system. In addition, only memory 205, processor 210, O/S 215, cache 250, data caching module 300 is shown for one server 200, but each server 200 in the system can have these components.

The data caching module 300, which can execute in memory 205 of the server 200, can include program code which, when executed, can calculate a time period for how long a mobile device 290 will be in a cell of the cellular network upon receiving information for the mobile device 290 from the cellular network. Of note, the information the server 200 can receive from the cellular network can include, but is not limited to field strength, location of the mobile device, speed of the mobile device, direction of travel of the mobile device, and bandwidth. The data caching module 300 can calculate how much data will be used by the mobile device 290 for the calculated time period and cache the data to be used by the mobile device 290 for the time period in the cell. In this way, only an optimal amount of data will be cached; in other words, only the data an end user will use while in the cell will be cached.

The data caching module 300 can further include program code which, when executed, can notify a server 200 in an adjacent cell to begin caching data for the mobile device 290 about to transition into the adjacent cell upon identifying the adjacent cell the mobile device 290 will transition into. In addition, the module 300 can determine whether a mobile device 290 from another cell is approaching that requires the same data. If the same data is being used by another mobile device 290, then the data caching module 300 can preserve the cached data on the server 200, but, on the other hand, if another mobile device 290 does not require the cached data, the cached data can be released. Of note, release of the cached data can be optimized based on the information the module 300 receives from the cellular network including, but not limited to field strength, location of the mobile device, speed of the mobile device, direction of travel of the mobile device, and bandwidth. Of further note, release of the cached data is not limited to determining whether or not another mobile device 290 requires the cached data.

Figure 3:
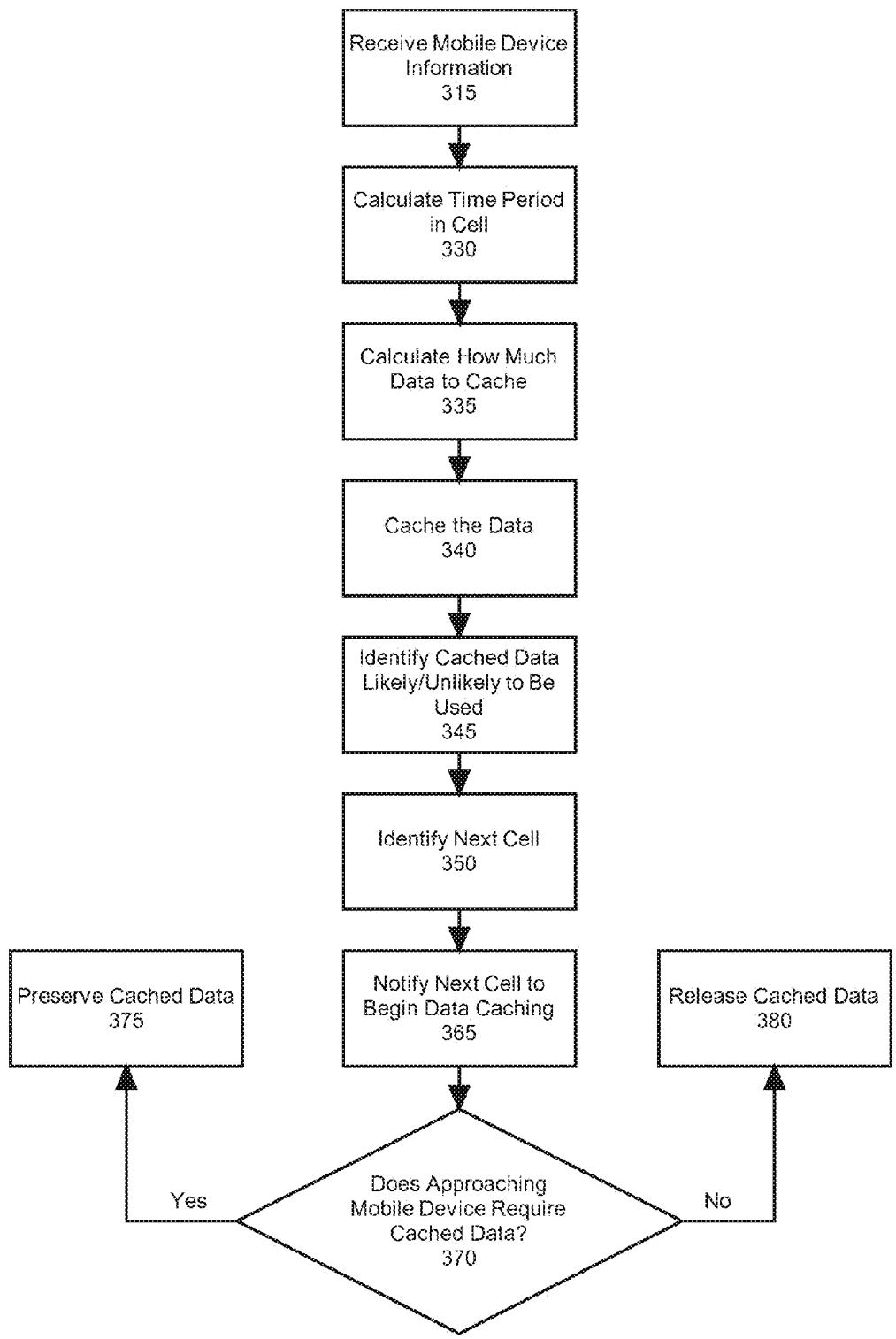

In even yet further illustration of the operation of the program code of the data caching module 300, FIG. 3 is a flow chart illustrating a process for caching data in a cellular network. Beginning in step 315, a server, for instance a streaming server, can receive mobile device information from a cellular network. The information can include but is not limited to field strength, location of the mobile device, speed of the mobile device, direction of travel of the mobile device, and bandwidth. Upon receiving the information, a time period for how long the mobile device will be in a cell can be calculated, as indicated in step 330. In other words, the length of time the mobile device will be in one cell based upon, for instance, the current location, speed, and direction of travel of the mobile device, before crossing the average transition boundary to an adjacent cell can be calculated. The amount of data that should be cached given the calculated time period can then also be calculated, as shown in step 335, and then cached, as in step 340. Optionally, in step 345, the cached data can be identified as likely or unlikely to be used based upon the information received from the cellular network. For instance, if particular data, such as a movie, is seldom requested by mobile devices in a cell and mobile devices in adjacent cells are also not viewing the movie, then the data is unlikely to be used.

Of note, the next cell the mobile device will transition to can be identified, as indicated in step 350. Upon identifying the next cell, the next cell (more specifically, the server in the next cell) can be notified to begin data caching for the incoming mobile device, as shown in step 365. In this way, when the mobile device arrives in the next cell the remainder of the data is ready. In addition, in step 370, a cell (more specifically, the server in the cell) can determine if an approaching mobile device from an adjacent cell requires the cached data based upon information received from adjacent cells. If the approaching mobile device requires the cached data, then the cached data can be preserved, as indicated in step 375, but if the approaching mobile device does not require the cached data, the cached data can be released, as in step 380.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A data caching system comprising:
   an edge server with at least one processor and memory coupled to a domain name server (DNS) and disposed within a cell site of a cellular network;
   a cache coupled to the edge server; and,
   a data caching module executing in memory of the edge server, the module comprising program code enabled to calculate a time period for how long a mobile device will be serviced by the cell site upon receiving travel data for the mobile device from the cellular network, to calculate how much data will be used by the mobile device for the calculated time period, and to cache the data within the cache to be used by the mobile device for the time period during which the mobile device remains serviced by the cell site.

2. The system of claim 1, wherein the data caching module further comprises program code enabled to notify an edge server in an adjacent cell site to begin caching data for the mobile device when it is determined that the mobile device is about to transition into the adjacent cell.

3. The system of claim 1, wherein the data caching module further comprises program code enabled to preserve cached data in the cache of the edge server in response to determining a second mobile device requires the cached data.

4. The system of claim 3, wherein the data caching module further comprises program code enabled to release cached data in response to determining a second mobile device does not require the cached data.

5. The system of claim 1, wherein the travel data is selected from the group consisting of field strength, location of the mobile device, speed of the mobile device, direction of travel of the mobile device, and bandwidth.

6. A computer program product for data caching in a cellular network, the computer program product comprising:
   a non-transitory computer readable storage medium comprising a memory device having computer readable program code embodied therewith, the computer readable program code comprising:
   computer readable program code for calculating a time period for how long a mobile device will be serviced by a cell site of the cellular network upon receiving travel information for the mobile device from the cellular network;
   computer readable program code for calculating how much data will be used by the mobile device for the calculated time period; and,
   computer readable program code for caching the data to be used by the mobile device for the time period in the cell site.

7. The computer program product of claim 6, wherein the computer readable program product further comprises:
   computer readable program code for notifying an edge server in an adjacent cell site to begin caching data for the mobile device about to transition into the adjacent cell site.

8. The computer program product of claim 6, wherein the computer readable program product further comprises:
   computer readable program code for preserving cached data on an edge server in response to determining a second mobile device requires the cached data.

9. The computer program product of claim 8, wherein the computer readable program product further comprises:
   computer readable program code for releasing the preserved cached data in response to determining a second mobile device does not require the cached data.

10. The computer program product of claim 6, wherein the travel information is selected from the group consisting of field strength, location of the mobile device, speed of the mobile device, direction of travel of the mobile device, and bandwidth.

* * * * *